United States Patent
Irifune et al.

(10) Patent No.: US 6,277,941 B1
(45) Date of Patent: Aug. 21, 2001

(54) ORGANOPOLYSILOXANE COMPOSITION

(75) Inventors: Shinji Irifune; Kouichi Nakazato; Kenichi Isobe, all of Gunma-ken (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 0 days.

(21) Appl. No.: 09/448,282

(22) Filed: Nov. 24, 1999

Related U.S. Application Data

(63) Continuation-in-part of application No. 09/151,737, filed on Sep. 11, 1998, now abandoned.

(30) Foreign Application Priority Data

Sep. 12, 1997 (JP) .................................................. 9-268111
Sep. 8, 1998 (JP) .................................................. 10-253454

(51) Int. Cl.$^7$ .................................................. C08G 77/08
(52) U.S. Cl. .................. 528/20; 528/15; 528/31; 528/32
(58) Field of Search .................. 528/15, 20, 31, 528/32

(56) References Cited

U.S. PATENT DOCUMENTS

| | | | |
|---|---|---|---|
| 5,214,074 | * 5/1993 | Takahashi et al. ............... | 521/88 |
| 5,708,046 | 1/1998 | Jones et al. ..................... | 522/99 |
| 6,017,587 | * 1/2000 | Kleyer et al. ..................... | 427/387 |
| 6,124,419 | * 9/2000 | Armstrong et al. ............... | 528/15 |

OTHER PUBLICATIONS

Office Action dated Jun. 25, 1999, by Melvyn I. Marquis of Group Art Unit 1712 regarding 09/151,737 (Irifune et al.).

* cited by examiner

*Primary Examiner*—Robert Dawson
*Assistant Examiner*—Jeffrey B. Robertson
(74) *Attorney, Agent, or Firm*—Millen, White, Zelano & Branigan, P.C.

(57) ABSTRACT

An organopolysiloxane composition comprising (1) 100 parts by weight of an organopolysiloxane having at least two unsaturated groups per molecule, (2) 0.1–30 parts by weight of a liquid organohydrogenpolysiloxane having at least two hydrogen atoms attached directly to silicon atoms (≡Si—H bonds) per molecule, (3) 0.1–6.0 parts by weight of an addition reaction control agent prepared by mixing (a) an acetylene alcohol and (b) a silylated acetylene alcohol in a (b)/(a) ratio ranging from greater than 5 to no greater than 100 on a weight basis, and (4) a catalytic amount of a platinum metal catalyst.

14 Claims, No Drawings

ORGANOPOLYSILOXANE COMPOSITION

This application is a continuation-in-part of Ser. No.09/151,737, filed Sep. 11, 1998, now abandoned the entire disclosure of which is hereby incorporated by reference.

FIELD OF THE INVENTION

The present invention relates to an organopolysiloxane composition and, more particularly, to an organopolysiloxane composition which is suitable for the formation of a releasable cured film and has excellent stability.

BACKGROUND OF THE INVENTION

In general, organopolysiloxane-utilized release agents are classified by types of the curing reactions they induce. Hitherto, the so-called addition reaction type organopolysiloxane compositions comprising alkenyl group-containing organopolysiloxanes, organohydrogenpolysiloxanes and platinum catalysts have prevailingly utilized in release agents for, e.g., adhesive labels and adhesive tapes.

For utilization of addition reaction in silicones for released paper use, the foregoing compositions require control agents that, though inhibit the reaction of platinum catalysts at room temperature, ensure rapid progress of the reaction between alkenyl group-containing organopolysiloxanes and organohydrogenpolysiloxanes under high temperatures. On such control agents, there have already been various proposals and it has been disclosed that acetylene alcohols are useful in particular (Japanese Tokko Sho 44-31476, Japanese Tokkai Hei 6-329917 and Japanese Tokkai Hei 9-143371, wherein the term "Tokko" as used herein means "an examined patent publication" and the term "Tokkai" as used herein means "an unexamined published patent application").

For the viewpoint of improving the productivity, on the other hand, high-speed curing under low temperatures has been required for silicone compositions in recent years. To meet such a requirement, the measure of increase in the amount of a catalyst used has often been taken. However, such a measure has a drawback of advancing the progress of gelation in a silicone treatment bath with the lapse of time although it can enhance initial curability. Even if the amount of a catalyst used is not increased in particular, gelation occurs similarly to the case of increasing the catalyst amount so long as the silicone treatment bath is left to stand under high temperatures for a long time.

With the intention of preventing such a gelation phenomenon, the use of an addition reaction controlling agent in an increased amount can lengthen the pot life, but lowers the initial curability. In the case where the addition reaction controlling agent is selected from the long-chain α-acetylene alcohols as disclosed in Japanese Tokkai Hei 6-329917, the pot life can be lengthened even if the amount used is small, but the initial curability is lowered.

On the other hand, there are known the control agents prepared by silylating the OH groups of acetylene alcohols (Japanese Tokkai Sho 61-261). These control agents cause no curability drop in silicone compositions even when their addition amount is increased so as to secure adequate control effect. However, the use of such an agent in a large amount causes a curability drop in the treatment bath with the lapse of time although it has no influence on the initial curability.

Further, it is disclosed in Japanese Tokkai Hei 9-143371 that the combined use of two control agents differing in boiling point can lengthen the time required for gelation in a thin-film state. Even when such a method is adopted, it is difficult to ensure a sufficient pot life and no curability drop in silicone compositions under a strict condition such that the amount of a catalyst used is increased or the treatment bath is left to stand at high temperatures.

Thus, there has been a strong request for control agents capable of ensuring both sufficient pot life and excellent curing properties in a silicone composition even when the catalyst amount is increased or the treatment bath is left under high temperatures.

Under these circumstances, we have made further studies on the control action of conventional acetylene alcohols and silylated compounds thereof. As a result thereof, the behaviors of such compounds in a silicone treatment bath have became clear.

More specifically, in the case of using an acetylene alcohol as control agent, the acetylene alcohol coordinates strongly with a platinum metal catalyst immediately after preparing the treatment bath to lower the catalyst activity. The acetylene alcohol-coordinated catalyst, though its activity as an addition reaction catalyst is lowered, cannot completely stop the addition reaction but still has an ability to advance catalytic cycles of the addition reaction.

However, since the triple bond of an acetylene alcohol is more liable to the addition reaction than the alkenyl group(s) in the siloxane, the effective quantity of the acetylene alcohol in the treatment bath is decreased with the lapse of time, and thereby the shortage of control effect is caused to result in gelation of the treatment bath. Although the time required for gelation can be lengthened by increasing the amount of an acetylene alcohol used, this measure renders the control effect too strong; as a result, the initial curability is lowered.

In the case of using a silylated acetylene alcohol as control agent, the silylated acetylene alcohol coordinates with a platinum metal catalyst to lower the activity of the catalyst similarly to acetylene alcohols, but it has weaker coordination strength than acetylene alcohols, so that the coordinated catalyst is inferior in ability to control the addition reaction. Thus, even when the silylated acetylene alcohols are used in a large amount, the change in initial curability is not so large. However, the use of silylated acetylene alcohol in a large quantity causes a drop in curability with the lapse of time because the triple bond of a silylated acetylene alcohol can undergo addition reaction and the consumption of SiH bonds proceeds via the addition reaction with a large number of triple bonds present in the treatment bath.

As a result of our intensive studies made on the assumption that the combined use of these two types of control agents can effect both long pot life and excellent curing properties, it has been found that the combined use of a small amount of acetylene alcohol and a large amount of silylated acetylene alcohol in a silicone treatment bath enables the acquisition of satisfactory initial curability, can prevent the lowering of curability even under a condition that the treatment bath has an increased catalyst content and is left to stand, and can minimize the change in release characteristics of a curable silicone composition; thereby achieving the present invention.

SUMMARY OF THE INVENTION

Therefore, an object of the present invention is to provide an addition curable silicone composition which can acquire releasability by curing, and has high stability enough to hardly cause changes in release characteristics and curing properties with the lapse of time even under a condition that the amount of a catalyst used is increased or the treatment bath thereof is left to stand under high temperatures.

The above-described object of the present invention is attained with an organopolysiloxane composition which comprises:
(1) 100 parts by weight of an organopolysiloxane having at least two unsaturated groups per molecule,
(2) 0.1–30 parts by weight of a liquid organohydrogenpolysiloxane having at least two hydrogen atoms per molecule which are attached directly to silicon atoms (namely at least two ≡Si—H bonds),
(3) 0.1–6.0 parts by weight of an addition reaction control agent constituted of (a) an acetylene alcohol represented by the following structural formula (I) and (b) a silylated acetylene alcohol represented by the following structural formula (II), wherein the (b)/(a) ratio is from greater than 5 to no greater than 100 on a weight basis, and: both alcohols (a) and (b) have a boiling point of 170° C. or below at atmospheric pressure; or both alcohols (a) and (b) have a boiling point of 130° C. or above at atmospheric pressure, and
(4) a catalytic amount of a platinum metal catalyst;

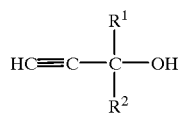

(I)

wherein $R^1$ and $R^2$ are each a hydrogen atom or a group selected from alkyl groups or aryl groups,

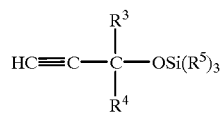

(II)

wherein $R^3$ and $R^4$ are each a hydrogen atom or a group selected from alkyl groups or aryl groups, and $R^5$ is an alkyl or aryl group.

In accordance with the present invention, the addition reaction control agent used for an organopolysiloxane composition is constituted of a small amount of acetylene alcohol capable of forming a strong coordination bond with a platinum metal catalyst to lower the activity of the catalyst and a very large amount of silylated acetylene alcohol capable of functioning as a substrate for the slightly progressing addition reaction, so that the present composition has a long pot life and hardly suffers deterioration in release characteristics and curing properties even when the treatment bath thereof is left to stand for a long time.

DETAILED DESCRIPTION OF THE INVENTION

The organopolysiloxane having at least two alkenyl groups per molecule which is used as Component (1) of a silicone composition according to the present invention is represented by compositional formula $R^6_a R^7_b SiO_{(4-a-b)/2}$ wherein $R^6$ groups are the same or different monovalent unsubstituted or substituted hydrocarbon groups, $R^7$ groups are alkenyl groups represented by formula —$C_n H_{2n}$CH=$CH_2$ (wherein n is an integer of 0 to 6), a is 0 or a positive number smaller than 3 and b is a positive number of no greater than 3, provided that 1 <a+b <3.

In this organopolysiloxane, it is desirable that the proportion of alkenyl groups attached directly to silicon atoms to the total substituent groups ($R^6$ and $R^7$ groups) present in one molecule be from 0.05 to 50.0 mole %, particularly preferably from 0.2 to 10 mole %. When the proportion of alkenyl groups is lower than 0.05 mole %, there are some cases where the resulting composition cannot have a practical curing speed; while, when it is increased beyond 50.0 mole %, the resulting composition suffers deterioration in release characteristics.

The unsubstituted or substituted monovalent hydrocarbon group represented by $R^6$ desirably contains from 1 to 30 carbon atoms. Examples of such a monovalent hydrocarbon group include alkyl groups (e.g., methyl, ethyl, propyl, butyl, pentyl, hexyl, octyl, decyl, dodecyl, tetradecyl, hexadecyl and octadecyl), cycloalkyl groups (e.g., cyclohexyl), aryl groups (e.g., phenyl, naphthyl and tolyl) and groups formed by substituting halogen atom(s), cyano group(s), hydroxyl group (s) or the like for a part or all of hydrogen atoms attached to carbon atoms present in the above-recited groups (e.g., chloromethyl, 3,3,3-trifluoropropyl, cyanopropyl, phenol and hindered phenols). Of these groups, methyl, phenyl and 2–8C alkyl groups are preferred over the others. In particular, it is favorable that the proportion of methyl groups in the groups attached directly to silicon atoms, excluding the alkenyl groups, be at least 50 mole % to the total substituent groups.

The organopolysiloxane as Component (1) may have a straight-chain or branched structure, and the end groups thereof are preferably alkenyl groups although they may be any of organic groups selected from methyl groups, hydroxyl groups, alkenyl groups, phenyl groups, or acryloxyalkyl groups. The suitable viscosity of an organopolysiloxane as Component (1) is not lower than 50 cs at 25° C.

The organohydrogenpolysiloxane used as Component (2) of an organopolysiloxane composition according to the present invention can be selected properly from known organohydrogen-polysiloxanes which have so far been used for silicone compositions of addition reaction type, provided that they have per molecule at least two hydrogen atoms directly attached to silicon atoms. To the organohydrogenpolysiloxane as Component (2), it is particularly advantageous that at least 90 mole % of the organic groups present therein be methyl groups. Such an organohydrogenpolysiloxane may have any of straight-chain, branched and cyclic structures, and examples thereof are illustrated below:

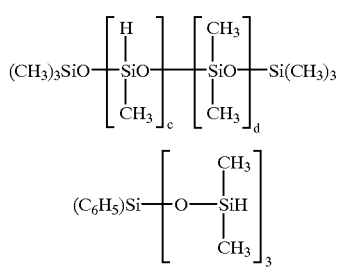

-continued

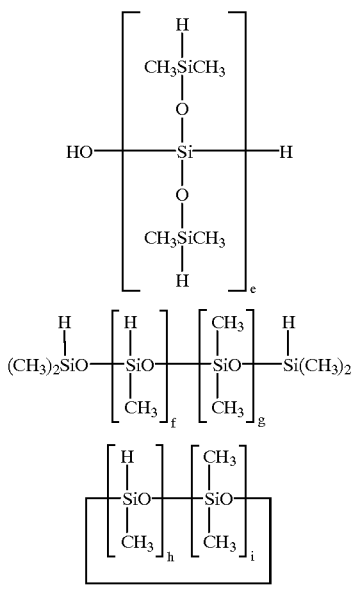

and co-hydrolysis condensates represented by the following average compositional formula;

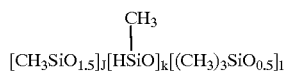

wherein c and h are each an integer of 2 or above, d, f and g are each 0 or a positive integer, and e, i, j, k and l are each a positive integer, provided that h+i is from 3 to 10. For the organohydrogenpolysiloxanes illustrated above, it is especially desirable that the integer "c" be in the range of 2 to 200, the integer "d" be in the range of 0 to 100, the integer "e" be in the range of 1 to 200, the integer "f" be in the range of 0 to 200, the integer "g" be in the range of 0 to 100, the integer "h" be in the range of 2 to 10 and the integer "i" be in the range of 1 to 8.

These organohydrogenpolysiloxanes may have their viscosity in a wide range of several Cs to hundreds of thousands cs at 25° C. The suitable amount of Component (2) used, though depends on the intended use of the present composition, is generally from 0.1 to 30 parts by weight, preferably not greater than 20 parts by weight, per 100 parts by weight of organopolysiloxane as Component (1).

The addition reaction control agent as Component (3) is the most important component in the present composition.

One constituent (Component (3-a)) of the addition reaction control agent is an acetylene alcohol represented by the foregoing formula (I).

The organic groups represented by $R^1$ and $R^2$ in formula (I) include straight-chain or branched alkyl groups, such as methyl, ethyl, propyl, isopropyl and butyl groups, and aryl groups such as phenyl and tolyl groups. Additionally, the alkyl groups represented by $R^1$ and $R^2$ can combine with each other to complete a ring together with the carbon atom to which they are attached. In particular, it is desirable for $R^1$ and $R^2$ groups that the number of total carbon atoms contained therein be not greater than 8, preferably 5 or below. When the number of total carbon atoms contained in $R^1$ and $R^2$ is greater than 8, the initial curability of the resulting composition is considerably lowered.

The effective amount of Component (3-a) mixed, though depends on the contents of Components (1), (2) and (4) in the present composition, is basically from 0.01 to 1.0 parts by weight per 100 parts by weight of Component (1).

When the amount of Component (3-a) used is less than 0.01 parts by weight, the resulting composition cannot acquire controlled curability; while, when it is more than 1.0 parts by weight, the initial curability of the resulting composition is lowered.

Examples of Component (3-a) which can be used in the present composition include 3-methyl-1-butyne-3-ol (b.p. 104° C.), 3-methyl-1-pentyne-3-ol (b.p. 121° C.), 3,5-dimethylhexy-3-ene-1-yne (b.p. 103° C.), 3,5-dimethyl-1-hexyne-3-ol (b.p. 150° C.) and 1-ethynyl-1-cyclohexanol (b.p. 180° C.).

The other constituent (Component (3-b)) of the addition reaction control agent is a silylated acetylene alcohol represented by the foregoing formula (II).

The organic groups represented by $R^3$ and $R^4$ in formula (II) include straight-chain or branched alkyl groups, such as methyl, ethyl, propyl, isopropyl and butyl groups, and aryl groups such as phenyl and tolyl groups. Additionally, the alkyl groups represented by $R^3$ and $R^4$ can combine with each other to complete a ring together with the carbon atom to which they are attached. In particular, it is desirable for $R^3$ and $R^4$ groups that the number of total carbon atoms contained therein be not greater than 8, preferably 5 or below. When the number of total carbon atoms contained in $R^3$ and $R^4$ is greater than 8, the initial curability of the resulting composition is considerably lowered. The organic group represented by $R^5$ can be selected from straight-chain or branched alkyl groups, such as methyl, ethyl, propyl, isopropyl and butyl groups, or aryl groups such as phenyl and tolyl groups.

Examples of Component (3-b) which can be used in the present composition include trimethyl(3-methyl-1-butyne-3-oxy)silane (b.p. 115° C.), methyltris(3-methyl-1-butyne-3-oxy)silane (b.p. 195° C.), and methylvinylbis(3-methyl-1-butyne-3-oxy)-silane (b.p. above 200° C.).

The effective amount of Component (3) mixed, though depends on the contents of Components (1), (2) and (4) in the present composition, is basically from 0.1 to 6.0 parts by weight per 100 parts by weight of Component (1).

When the amount of Component (3) used is less than 0.1 parts by weight, the resulting composition cannot acquire sufficient pot life; while, when it is more than 6.0 parts by weight, the resulting composition suffers deterioration in curability when it is left to stand.

Moreover, it is required that the ratio of the weight of Component (3-b) used to the weight of Component (3-a) used (abbreviated as the (b)/(a) ratio) be in the range $5 < (b)/(a) \leq 100$.

The action mechanism of the present control system using these two kinds of compounds in combination can be considered as follows: Upon preparation of the treatment bath, the acetylene alcohol (Component (3-a)) present in small quantity coordinates strongly with a platinum metal catalyst to lower the catalyst activity. On the other hand, the silylated acetylene alcohol (Component (3-b)) present in very large quantity functions as a substrate for the slightly progressing addition reaction to control the decrease in effective quantity of Component (3-a). In other words, the silylated acetylene alcohol controls the consumption of acetylene alcohol by functioning as a substrate for the addition reaction; as a result, the low activity state of the catalyst is retained for a long time, and thereby the consumption of SiH is controlled. Accordingly, the present composition can acquire a sufficiently long pot life without using the acetylene alcohol in such a large amount as to lower the initial curability.

As Component (4) of the present composition can be employed the platinum metal catalysts hitherto known as effective catalysts for progressing the addition curing reaction. Examples of such a catalyst include platinum catalysts, palladium catalysts and rhodium catalysts. Of these catalysts, platinum catalysts are preferred over the others, with examples including chloroplatinic acid, an alcohol or aldehyde solution of chloroplatinic acid and chelating compounds produced from chloroplatinic acid and olefin or vinylsiloxanes. Such a platinum catalyst may be added in a catalytic amount but, from the viewpoint of achieving both good quality and low cost in the formation of cured film, the suitable addition amount thereof is from 1 to 1,000 ppm, based on platinum, to the total amount of Components (1) and (2).

To the present silicone composition, other components can be added, if desired. For instance, organopolysiloxanes having neither vinyl groups nor hydrogen atoms attached directly to silicon atoms can be added for the purpose of modifying the releasability. Such optional components may be added in such amounts as not to affect adversely the effects of the present invention.

The present silicone composition can be prepared by mixing prescribed amounts of Components (1) to (4) and optional components. In mixing them, however, it is desirable that all components except Component (4) be homogeneously mixed first, and then Component (4) be added thereto. Additionally, the composition may be used as a solution in organic solvent, such as toluene, xylene or n-hexane, if desired.

The thus prepared silicone composition is coated on a substrate, such as paper or plastic film, and then cured by heating in a conventional manner. The substrate provided thereon a cured film of the present composition in the foregoing manner can be used as release coated paper.

The present invention will now be illustrated in greater detail by reference to the following Examples and Comparative Examples. However, the invention should not be construed as being limited to Examples described below.

The entire disclosure of all applications, patents and publications, cited above and below, and of corresponding Japanese applications No. Hei 9-268111, filed Sep. 12, 1997, and No. Hei 10-253454, filed Sep. 8, 1998, is hereby incorporated by reference.

Additionally, unless otherwise noted in the following examples, all "parts" are by weight, and the physical values shown in Tables are the data determined by the following testing methods.

Viscosity of Treatment Bath:
The viscosity that each organopolysiloxane composition has at 30° C. just after preparation is defined as the initial viscosity, and the viscosity that each organopolysiloxane composition has after 24-hour standing at 30° C. is defined as the viscosity after storage.

Curability:
The initial curability is evaluated as follows; Just after the preparation, each organopolysiloxane composition is coated on a polyethylene-laminated paper at a coverage rate of 0.6 g/m², and heated in an air circulation oven at 100° C. After the prescribed period of heating, the cured film thus formed is rubbed with fingers several times, and examined by visual observation as to whether it comes off or not and becomes opaque or not. When neither coming-off nor opacifying phenomenon is observed, the curing is regarded as complete, and the time required for complete curing is adopted as the index of initial curability.

With respect to the curability after storage, each organopolysiloxane composition is allowed to stand for 24 hours at 30° C., and then the curability thereof is evaluated by the same method as described above.

Release Force:
The initial release force is evaluated as follows; Just after the preparation, each organopolysiloxane composition is coated on a polyethylene-laminated paper at a coverage rate of 0.6 g/m², and heated for 30 seconds at 100° C. in an air circulation oven to form a cured film. Then, a Tesa-7475 tape (produced by BDF Co.) is applied to the cured film surface, and subjected to heat treatment at 70° C. for 2 hours. Then, the tape is peeled away from the film surface under the condition that the peeling angle is 180° and the peeling speed is 0.3 m/min, and the force (g/2.5 cm) required for the peeling is measured. This measured value is taken as the initial release force.

With respect to the release force after storage, each organopolysiloxane composition is allowed to stand for 24 hours at 30° C., and then the release force thereof is measured in the same way as described above. This measured value is taken as the release force after storage.

Residual Adhesion Rate:
The initial residual adhesion rate of each organopolysiloxane composition is evaluated as follows; The cured film is formed in the same manner as in the evaluation of the initial release force, and thereto is applied a polyester tape (Nitto-31B, trade name, a product of Nitto Electric Industrial Co., Ltd.). The tape-applied film is subjected to heat treatment at 70° C. for 20 hours while imposing a load of 20 g/cm² thereon, and then the tape is peeled away from the film and applied to a stainless steel plate. Thereafter, the tape is peeled away from the plate, and the force (g/2.5 cm) required for the peeling (hereinafter abbreviated as "the peeling force") is measured.

In addition, the foregoing polyester tape is applied to a Teflon sheet, subjected to the same treatments as described above, and examined for the peeling force (g/2.5 cm) in the same way as described above. The peeling force thus examined is referred to as the standard peeling force.

The percentage of the peeling force measured in the case of each organopolysiloxane composition to the standard peeling force is taken as the initial residual adhesion rate.

With respect to the residual adhesion rate after storage, each organopolysiloxane composition is allowed to stand for 24 hours at 30° C., and then the residual adhesion rate thereof is measured in the same way as described above. The percentage of this measured value to the standard peeling force is taken as the residual adhesion rate after storage.

EXAMPLE 1

An organopolysiloxane solution as component (1) was prepared by dissolving, in 570 parts of toluene, 30 parts of vinyl groups-containing organopolysiloxanes represented by the following average compositional formula (i) and having a vinylation rate of 0.0075 mole/100 g and a viscosity of 10,000 cp when diluted with toluene to 30 weight %:

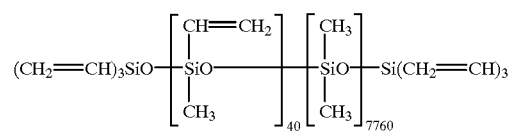

(i)

To this solution [Component (1)] was added 0.65 parts of methylhydrogenpolysiloxanes represented by the following average compositional formula (ii) and having a viscosity of 250 cp and a SiH value of 1.0 ml/100 g as Component (2);

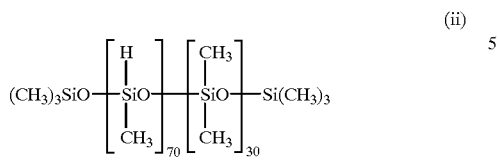

(ii)

Thereto were further added 0.1 parts of 3,5-dimethyl-1-hexyne-3-ol (b.p. 150° C.) as Component (3-a) and 0.8 parts of 1-dimethylpropynyloxytrimethylsilane (b.p. 115° C.) as Component (3-b). And these components were mixed thoroughly.

To this mixture was added a platinum-vinylsiloxane complex as Component (4) in the proportion of 200 ppm, based on platinum, to the foregoing polysiloxanes. Thus, a silicone Composition 1 was prepared, and examined for pot life, curability, release force and residual adhesion rate in accordance with the aforementioned methods respectively. The evaluation results obtained are shown in Table 1A.

EXAMPLE 2

A silicone Composition 2 was prepared in the same manner as in Example 1, except that the amount of 1-dimethyl-propynyloxytrimethylsilane added as Component (3-b) was changed to 1.2 parts. The characteristics of the thus prepared Composition 2 were examined by the same methods as adopted in Example 1. The evaluation results obtained are shown in Table 1A.

EXAMPLE 3

A silicone Composition 3 was prepared in the same manner as in Example 1, except that the amount of 3,5-dimethyl-1-hexyne-3-ol added as Component (3-a) was changed to 0.05 parts. The characteristics of the thus prepared Composition 3 were examined by the same methods as adopted in Example 1. The evaluation results are shown in Table 1.

EXAMPLE 4

A silicone Composition 4 was prepared in the same manner as in Example 1, except that 0.07 parts of 3-methyl-1-butyne-3-ol (b.p. 104° C.) was used as Component (3-a). The characteristics of the thus prepared Composition 4 were examined by the same methods as in Example 1. The evaluation results obtained are shown in Table 1A.

EXAMPLE 5

A silicone Composition 5 was prepared in the same manner as in Example 1, except that the Component (3-a) was changed to 0.05 parts of 1-ethynyl-1-cyclohexanol (b.p. 192° C.) and the Component (3-b) was changed to 0.4 parts of dimethyl-bis(3-methyl-1-butyne-3-oxy)silane (b.p. 195° C.). The characteristics of the thus prepared Composition 5 were examined by the same methods as in Example 1. The evaluation results obtained are shown in Table 1B.

EXAMPLE 6

A silicone Composition 6 was prepared in the same manner as in Example 1, except that the amount of Component (4) added was changed to 400 ppm, based on platinum. The characteristics of the thus prepared Composition 6 were examined by the same methods as in Example 1. The evaluation results obtained are shown in Table 1B.

EXAMPLE 7

A silicone Composition 7 was prepared in the same manner as in Example 2, except that the amount of Component (4) added was changed to 400 ppm, based on platinum. The characteristics of the thus prepared Composition 7 were examined by the same methods as in Example 2. The evaluation results obtained are shown in Table 1B.

EXAMPLE 8

A silicone Composition 8 was prepared in the same manner as in Example 3, except that the amount of Component (4) added was changed to 400 ppm, based on platinum. The characteristics of the thus prepared Composition 8 were examined by the same methods as in Example 3. The evaluation results obtained are shown in Table 1B.

EXAMPLE 9

A silicone Composition 9 was prepared in the same manner as in Example 4, except that the amount of Component (4) added was changed to 400 ppm, based on platinum. The characteristics of the thus prepared Composition 9 were examined by the same methods as in Example 4. The evaluation results obtained are shown in Table 1B.

EXAMPLE 10

A silicone Composition 10 was prepared in the same manner as in Example 5, except that the amount of Component (4) added was changed to 400 ppm, based on platinum. The characteristics of the thus prepared Composition 10 were examined by the same methods as in Example 5. The evaluation results obtained are shown in Table 1B.

COMPARATIVE EXAMPLE 1

A silicone Composition 11 was prepared in the same manner as in Example 1, except that 0.1 parts of 3,5-dimethyl-1-hexyne-3-ol alone was used as Component (3). The thus prepared Composition 11 was examined for pot life, curability, release force and residual adhesion rate in accordance with the same methods as adopted respectively in Example 1. The evaluation results obtained are shown in Table 1A.

COMPARATIVE EXAMPLE 2

A silicone Composition 12 was prepared in the same manner as in Comparative Example 1, except that the amount of control agent used was changed to 0.2 parts. The thus prepared Composition 12 was examined for pot life, curability, release force and residual adhesion rate in accordance with the same methods as adopted respectively in Comparative Example 1. The evaluation results obtained are shown in Table 1A.

COMPARATIVE EXAMPLE 3

A silicone Composition 13 was prepared in the same manner as in Comparative Example 1, except that the control agent used as Component (3) was changed to 0.8 parts of 1-dimethylpropynyloxytrimethylsilane. The thus prepared Composition 13 was examined for pot life, curability, release force and residual adhesion rate in accordance with the same methods as adopted respectively in Comparative Example 1. The evaluation results obtained are shown in Table 1A.

COMPARATIVE EXAMPLE 4

A silicone Composition 14 was prepared in the same manner as in Example 1, except that the amount of 1-dimethylpropynyloxytrimethylsilane added as Component (3-b) was changed to 0.3 parts. The thus prepared Composition 14 was examined for pot life, curability, release force and residual adhesion rate in accordance with the same methods as adopted respectively in Comparative Example 1. The evaluation results obtained are shown in Table 1 B.

COMPARATIVE EXAMPLE 5

A silicone Composition 15 was prepared in the same manner as in Comparative Example 1, except that the amount of Component (4) added was changed to 400 ppm, based on platinum. The thus prepared Composition 15 was examined for pot life, curability, release force and residual adhesion rate in accordance with the same methods as adopted respectively in Comparative Example 1. The evaluation results obtained are shown in Table 1B.

COMPARATIVE EXAMPLE 6

A silicone Composition 16 was prepared in the same manner as in Comparative Example 2, except that the amount of Component (4) added was changed to 400 ppm, based on platinum. The thus prepared Composition 16 were examined for pot life, curability, release force and residual adhesion rate in accordance with the same methods as adopted respectively in Comparative Example 2. The evaluation results obtained are shown in Table 1B.

COMPARATIVE EXAMPLE 7

A silicone Composition 17 was prepared in the same manner as in Comparative Example 3, except that the amount of Component (4) added was changed to 400 ppm, based on platinum. The thus prepared Composition 17 were examined for pot life, curability, release force and residual adhesion rate in accordance with the same methods as adopted respectively in Comparative Example 3. The evaluation results obtained are shown in Table 1B.

COMPARATIVE EXAMPLE 8

A silicone Composition 18 was prepared in the same manner as in Comparative Example 4, except that the amount of Component (4) added was changed to 400 ppm, based on platinum. The characteristics of the thus prepared Composition 18 were examined by the same methods as mentioned above respectively. The evaluation results obtained are shown in Table 1B.

TABLE 1A

| | Control Agent (amount added: pts. wt.) | | Amount of Catalyst (ppm) | In Initial Stage | | | | After Storage | | | |
|---|---|---|---|---|---|---|---|---|---|---|---|
| | | | | Viscosity (cp) | Curability (sec) | Release force (g/2.5 cm) | Residual Adhesion rate (%) | Viscosity (cp) | Curability (sec) | Release force (g/2.5 cm) | Residual adhesion rate (%) |
| Example 1 | 3,5-dimethyl-1-hexyne-3-ol | (0.1) | 200 | 14 | 10 | 23 | 95 | 14 | 25 | 24 | 97 |
| | 1-Dimethylpropynyloxytrimethyl-silane | (0.8) | | | | | | | | | |
| Example 2 | 3,5-dimethyl-1-hexyne-3-ol | (0.1) | 200 | 14 | 10 | 23 | 100 | 13 | 25 | 23 | 98 |
| | 1-Dimethylpropynyloxytrimethyl-silane | (1.2) | | | | | | | | | |
| Example 3 | 3,5-dimethyl-1-hexyne-3-ol | (0.05) | 200 | 14 | 10 | 20 | 99 | 14 | 20 | 26 | 98 |
| | 1-Dimethylpropynyloxytrimethyl-silane | (0.8) | | | | | | | | | |
| Example 4 | 3-methyl-1-butyne-3-ol | (0.07) | 200 | 14 | 10 | 24 | 98 | 13 | 25 | 20 | 98 |
| | 1-Dimethylpropynyloxytrimethyl-silane | (0.8) | | | | | | | | | |
| Example 5 | 1-Ethynyl-1-cyclohexanol | (0.05) | 200 | 14 | 10 | 22 | 96 | 16 | 25 | 24 | 97 |
| | Dimethylbis(3-methyl-1-butyne-3-oxy)silane | (0.4) | | | | | | | | | |
| Compar. Ex. 1 | 3,5-dimethyl-1-hexyne-3-ol | (0.1) | 200 | 14 | 10 | 19 | 100 | | gelation | | |
| Compar. Ex. 2 | 3,5-dimethyl-1-hexyne-3-ol | (0.2) | 200 | 14 | 14 | 27 | 98 | 22 | 35 | 38 | 89 |
| Compar. Ex. 3 | 1-Dimethylpropynyloxytrimethyl-silane | (0.8) | 200 | 14 | 10 | 17 | 99 | 15 | 45 | 59 | 83 |

TABLE 1B

| Example 6 | 3,5-dimethyl-1-hexyne-3-ol | (0.1) | 400 | 14 | 8 | 14 | 98 | 17 | 20 | 36 | 93 |
|---|---|---|---|---|---|---|---|---|---|---|---|
| | 1-Dimethylpropynyloxytrimethylsilane | (0.8) | | | | | | | | | |
| Example 7 | 3,5-dimethyl-1-hexyne-3-ol | (0.1) | 400 | 14 | 8 | 14 | 100 | 15 | 20 | 28 | 100 |
| | 1-Dimethylpropynyloxytrimethylsilane | (1.2) | | | | | | | | | |
| Example 8 | 3,5-dimethyl-1-hexyne-3-ol | (0.05) | 400 | 14 | 8 | 15 | 98 | 22 | 25 | 31 | 93 |
| | 1-Dimethylpropynyloxytrimethylsilane | (0.8) | | | | | | | | | |
| Example 9 | 3-methyl-1-butyne-3-ol | (0.07) | 400 | 14 | 8 | 14 | 100 | 17 | 20 | 28 | 96 |

TABLE 1B-continued

|  | 1-Dimethylpropynyloxytrimethylsilane | (0.8) | | | | | | | | |
|---|---|---|---|---|---|---|---|---|---|---|
| Example 10 | 1-Ethynyl-1-cyclohexanol | (0.05) | 400 | 14 | 9 | 15 | 98 | 19 | 25 32 | 95 |
|  | Dimethylbis(3-methyl-1-butyne-3-oxy)silane | (0.4) | | | | | | | | |
| Compar. Ex. 4 | 3,5-dimethyl-1-hexyne-3-ol | (0.1) | 200 | 14 | 10 | 22 | 96 | 50 | 40 45 | 92 |
|  | 1-Dimethylpropynloxytrimethylsilane | (0.3) | | | | | | | | |
| Compar. Ex. 5 | 3,5-dimethyl-1-hexyne-3-ol | (0.1) | 400 | 14 | 8 | 12 | 97 | | gelation | |
| Compar. Ex. 6 | 3,5-dimethyl-1-hexyne-3-ol | (0.2) | 400 | 14 | 10 | 16 | 94 | | gelation | |
| Compar. Ex. 7 | 1-Dimethylpropynloxytrimethylsilane | (0.8) | 400 | 14 | 8 | 14 | 97 | 28 | 35 53 | 63 |
| Compar. Ex. 8 | 3,5-dimethyl-1-hexyne-3-ol | (0.1) | 400 | 14 | 8 | 15 | 98 | | gelation | |
|  | 1-Dimethylpropynloxytrimethylsilane | (0.3) | | | | | | | | |

As can be seen from Table 1, the silicone compositions according to the present invention have excellent stability, and cause only slight changes in curability and release characteristics upon storage under high temperatures or in the presence of an increased amount of catalyst, in contrast to comparative compositions.

What is claimed is:

1. An organopolysiloxane composition comprising:
   (1) 100 parts by weight of an organopolysiloxane having at least two unsaturated groups per molecule,
   (2) 0.1–30 parts by weight of a liquid organohydrogenpolysiloxane having at least two≡Si-H bonds per molecule,
   (3) 0.1–6.0 parts by weight of an addition reaction control agent prepared by mixing (a) an acetylene alcohol represented by the following structural formula (I) and (b) a silylated acetylene alcohol represented by the following structural formula II, wherein both acetylene alcohol and silylated acetylene alcohol have a boiling point of 170° C. or below or a boiling point of 130° C. or above at atmospheric pressure, and the (b)/(a) ratio ranges from greater than 5 to no greater than 100 on a weight basis;

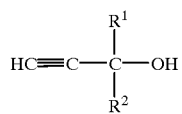
(I)

wherein $R^1$ and $R^2$ are each a hydrogen atom or a group selected from alkyl groups or aryl groups,

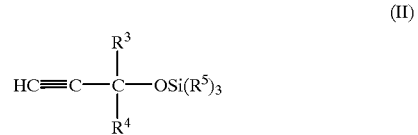
(II)

wherein $R^3$ and $R^4$ are each a hydrogen atom or a group selected from alkyl groups or aryl groups, and $R^5$ is an alkyl or aryl group, and
   (4) a catalytic amount of a platinum metal catalyst.

2. An organopolysiloxane composition according to claim 1, wherein the number of total carbon atoms contained in $R^1$ and $R^2$ in formula (I) is not greater than 8.

3. An organopolysiloxane composition according to claim 1, wherein the acetylene alcohol (a) is contained in an amount of from 0.01 to 1.0 parts by weight per 100 parts by weight of organopolysiloxane as Component (1).

4. An organopolysiloxane composition according to claim 1, wherein the number of total carbon atoms contained in $R^3$ and $R^4$ in formula (II) is not greater than 8.

5. An organopolysiloxane composition according to claim 1, wherein the unsaturated groups of the organopolysiloxane as Component (1) are alkenyl groups of formula —$C_nH_{2n}CH=CH_2$ wherein n is an integer of 0 to 6.

6. An organopolysiloxane composition according to claim 5, wherein the organopolysiloxane as Component (1) has alkenyl groups attached directly to silicon atoms in a proportion of 0.05 to 50.0 mole % to the total organic groups present therein.

7. An organopolysiloxane composition according to claim 1, wherein the organohydrogenpolysiloxane as Component (2) has methyl groups in a proportion of at least 90 mole % to the total organic groups present therein.

8. An organopolysiloxane composition according to claim 1, wherein said acetylene alcohol (a) and said silylated acetylene alcohol (b) both have boiling points of 130° C. or above.

9. An organopolysiloxane composition according to claim 8, wherein said acetylene alcohol (a) and said silylated acetylene alcohol (b) both have boiling points of 170° C. or below.

10. An organopolysiloxane composition according to claim 1, wherein acetylene alcohol (a) and silylated acetylene alcohol (b) both have boiling points of 170° C. or below.

11. An organopolysiloxane composition according to claim 10, wherein said acetylene alcohol (a) and said silylated acetylene alcohol (b) both have boiling points of 130° C. or below.

12. An organopolysiloxane composition according to claim 1, wherein said acetylene alcohol (a) and said silylated acetylene alcohol (b) both have boiling points of 130–170° C.

13. An organopolysiloxane composition according to claim 1, wherein
   $R^1$ and $R^2$ are, in each case independently, methyl, ethyl, propyl, isopropyl, butyl, phenyl or tolyl; or
   $R^1$ and $R^2$ are together an alkylene forming a ring together with the carbon atoms to which they are attached and the total number of carbon atoms in $R^1$ and $R^2$ is not greater than 8;
   $R^3$ and $R^4$ are, in each case independently, methyl, ethyl, propyl, isopropyl, butyl, phenyl or tolyl; or
   $R^3$ and $R^4$ are together an alkylene forming a ring together with the carbon atom to which they are attached wherein the total number of carbon atoms in $R^3$ and $R^4$ is not greater than 8; and
   $R^5$ is methyl, ethyl, propyl, isopropyl, butyl, phenyl or tolyl.

14. An organopolysiloxane composition comprising:
   (1) 100 parts by weight of an organopolysiloxane having at least two unsaturated groups per molecule,
   (2) 0.1–30 parts by weight of a liquid organohydrogenpolysiloxane having at least two≡Si-H bonds per molecule, (3) 0.1–6.0 parts by weight of an addition reaction control agent prepared by mixing (a) an acetylene alcohol represented by the following structural formula (I) and (b) a silylated acetylene alcohol represented by the following structural formula II, wherein both acetylene alcohol and silylated acetylene alcohol have boiling points below 170° C. or boiling points above 130° C. at atmospheric pressure, and the (b)/(a) ratio ranges from greater than 5 to no greater than 100 on a weight basis;

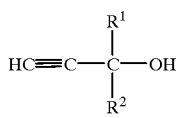
(I)

wherein $R^1$ and $R^2$ are each a hydrogen atom or a group selected from alkyl groups or aryl groups,

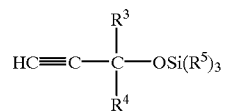
(II)

wherein $R^3$ and $R^4$ are each a hydrogen atom or a group selected from alkyl groups or aryl groups, and $R^5$ is an alkyl or aryl group, and (4) a catalytic amount of a platinum metal catalyst.

* * * * *